United States Patent
Eberl et al.

(10) Patent No.: US 12,234,643 B2
(45) Date of Patent: Feb. 25, 2025

(54) RADIALLY ORIENTED HONEYCOMB AND STRUCTURES FORMED THEREFROM

(71) Applicants: BATTELLE SAVANNAH RIVER ALLIANCE, LLC, Aiken, SC (US); UNITED STATES DEPARTMENT OF ENERGY, Washington, DC (US)

(72) Inventors: Kurt R. Eberl, Aiken, SC (US); Joshua P. Flach, Aiken, SC (US); James M. Shuler, Germantown, MD (US); Paul S. Blanton, Aiken, SC (US); William R. Johnson, North Augusta, SC (US)

(73) Assignee: Battelle Savannah River Alliance, LLC, Aiken, SC (US)

( * ) Notice: Subject to any disclaimer, the term of this patent is extended or adjusted under 35 U.S.C. 154(b) by 0 days.

(21) Appl. No.: 17/831,166

(22) Filed: Jun. 2, 2022

(65) Prior Publication Data
US 2023/0392377 A1  Dec. 7, 2023

(51) Int. Cl.
*E04C 2/36* (2006.01)
*B31D 3/02* (2006.01)
(Continued)

(52) U.S. Cl.
CPC ............ *E04C 2/365* (2013.01); *B31D 3/0207* (2013.01); *B31D 3/0292* (2013.01); *B31D 5/02* (2013.01); *E04B 2/50* (2013.01); *B32B 3/12* (2013.01); *E04B 2002/0223* (2013.01); *E04C 2/328* (2013.01)

(58) Field of Classification Search
CPC .................................. E04C 2/328; B32B 3/12
See application file for complete search history.

(56) References Cited

U.S. PATENT DOCUMENTS

| 3,259,961 A | 7/1966 | Bryand |
| 3,320,399 A | 5/1967 | Luthi |

(Continued)

FOREIGN PATENT DOCUMENTS

| DE | 10 2013 017 644 B4 | 9/2017 |
| WO | WO 2002/102539 A2 | 12/2002 |

OTHER PUBLICATIONS

NASA Tech Brief, Ames Research Center, Aug. 1973, 2 pages.
International Search Report and Written Opinion for PCT/US2023/023804, dated Aug. 20, 2023, 10 pages.

*Primary Examiner* — Mark Ruthkosky
*Assistant Examiner* — Julia L Rummel
(74) *Attorney, Agent, or Firm* — Dority & Manning, P.A.

(57) ABSTRACT

Structures including a curved corrugated wall fabricated from a plurality of layers formed of one or more shaped strips and methods of forming the structures are described. A shaped strip used in the fabrication includes a variable profile across the width of the strip with a first edge of a strip defining a series of cell profiles of a first geometric shape and a second, opposite edge of the strip defining a series of cell profiles of a second, different geometric shape, with each cell transitioning from the first profile to the second profile across the width of the strip. The geometry of the cell profiles at either end of each cell can be designed with respect to one another to allow for radial orientation of the strip about an axis with little or no deformation or stress on the strip edges.

14 Claims, 4 Drawing Sheets

(51) Int. Cl.
  *B31D 5/02* (2017.01)
  *E04B 2/50* (2006.01)
  *B32B 3/12* (2006.01)
  *E04B 2/02* (2006.01)
  *E04C 2/32* (2006.01)

(56) References Cited

U.S. PATENT DOCUMENTS

| | | |
|---|---|---|
| 3,564,686 A | 2/1971 | Bryand |
| 3,788,117 A | 1/1974 | Chester et al. |
| 4,411,381 A | 10/1983 | Ittner et al. |
| 4,477,089 A * | 10/1984 | Hoffman ................ F01D 11/02 |
| | | 415/173.7 |
| 4,491,265 A | 1/1985 | Ittner et al. |
| 4,981,744 A * | 1/1991 | Swank .................... E04C 2/328 |
| | | 428/116 |
| 5,306,890 A | 4/1994 | Minamida et al. |
| 6,316,121 B1 | 11/2001 | Maus |
| 7,108,168 B2 | 9/2006 | Brück et al. |
| 7,943,096 B2 | 5/2011 | Kurth et al. |
| 9,393,521 B2 | 7/2016 | Bureck et al. |
| 9,540,978 B2 | 1/2017 | Hirth et al. |
| 2006/0191982 A1 | 8/2006 | Bruck et al. |
| 2008/0295556 A1 | 12/2008 | Hodgson et al. |
| 2009/0193643 A1 | 8/2009 | Sano et al. |

\* cited by examiner

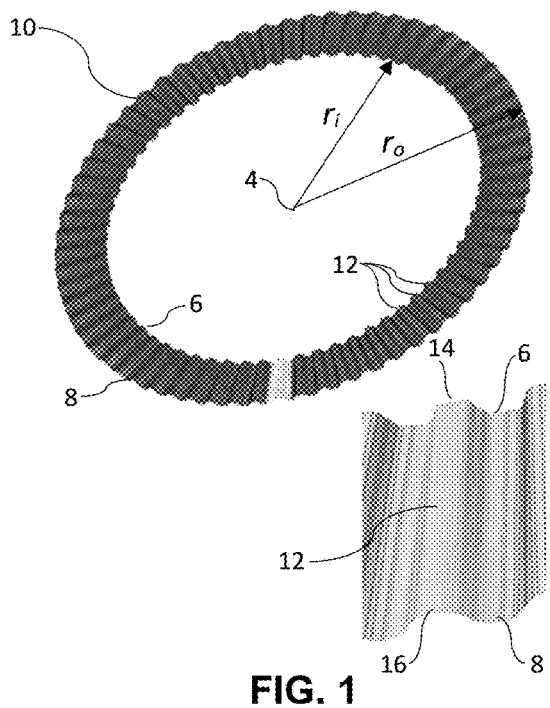
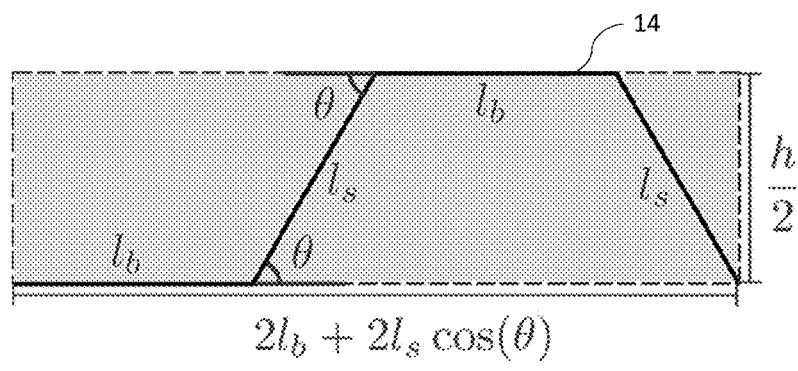
FIG. 2
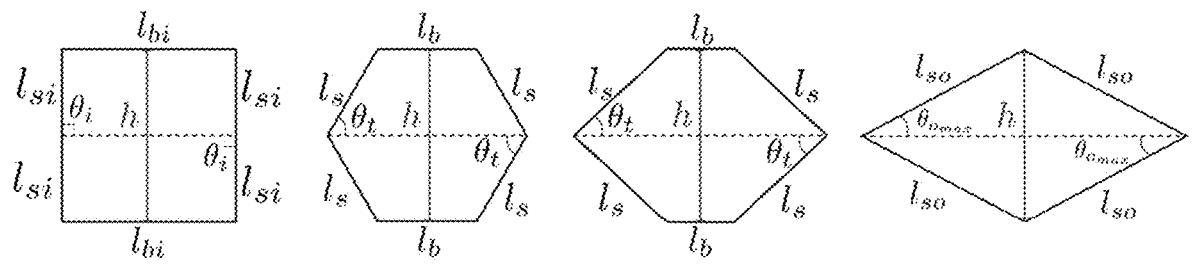
FIG. 3

RADIALLY ORIENTED HONEYCOMB AND STRUCTURES FORMED THEREFROM

STATEMENT REGARDING FEDERALLY SPONSORED RESEARCH OR DEVELOPMENT

This invention was made with Government support under Contract No. DE-AC09-08SR22470, awarded by the United States Department of Energy. The Government has certain rights in the invention.

BACKGROUND

Honeycomb structures are generally formed from elongated material that has been shaped along the length to define a series of cells (e.g., hexagon, sine wave, triangle, etc.). Spirally winding a single shaped strip or stacking multiple strips will provide a low density, but relatively strong, corrugated wall. When forming a curved wall, the inner surface radius and circumference of the wall will be less than that of the outer surface, and the strip forming the wall will thus be stretched at the outer edge and/or compressed at the inner edge. As a result, the wall cells will be forced to be axially taller at the inner edge than at the outer edge and/or the strip material will be stretched at the outer edge and compressed at the inner edge. These introduced forces can lead to deformation of the structure, e.g., saddling effect, in addition to introducing material weakness due to the stretching and compression necessary to form the curvature of the wall. Moreover, these effects severely limit the radial width of a corrugated wall, as deformations and material strains beyond a limited amount will introduce unacceptable shape and strength characteristics to the structure.

Attempts have been made to address such issues. For instance, modifications to the period and/or amplitude of the cells forming the shaped strips have been examined. Layering of different materials and/or interleaving strips of different corrugation patterns to "ease" the deformations and structural strains has also been suggested. Others have attempted introducing expansion joints at the external edge of the strips. Honeycomb-type patterns with increased flexibility have been introduced to alleviate stresses from bending, and origami rings have been proposed, which begin with a circular strip, however, such proposals have introduced other structural issues as well as greater manufacturing complexity. While some of these attempts have provided improvement in the art, room still remains for further improvement. For instance, the above approaches still severely limit the radial width of a corrugated curved wall, which, in turn, severely limits mechanical characteristics of structures formed with the curved wall.

What are needed in the art are structures that include curved corrugated walls formed from radially oriented shaped strips and methods of forming such strips and walls that address issues such as these.

SUMMARY

According to one embodiment, disclosed is a structure that includes a curved wall. The curved wall defines a radius of curvature and includes a radially oriented strip along the curvature. The strip has a first edge at an inner surface of the wall and a second edge at an outer surface of the wall. The strip is shaped to define a cell that extends from the first edge to the second edge in the radial direction of the curved wall. In addition, the cell defines a first cell profile at the first edge and defines a second, different cell profile at the second edge. The first and second edges are across a strip width from one another and the first cell profile transitions to the second cell profile along the cell as it extends across the strip width in the radial direction of the curved wall.

Also disclosed is a method for forming a structure. A method can include shaping a strip such that upon the shaping, the strip defines a series of cells along the length of the strip, with each cell extending across the strip width from a first edge to the second edge of the strip. Each cell defines a first cell profile at the first edge and a second, different profile at the second edge and each cell transitions from the first profile to the second profile as it extends across the width of the strip. Due to the change in cell profile across the width of the strip, the strip will naturally curve about an axis such that each cell extends from the first edge to the second edge along a radial direction from the axis. The curved strip can thus form at least one layer of a curved wall of the structure.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which:

FIG. 1 schematically illustrates one embodiment of a curved strip and includes an enlarged segment of the strip illustrating a transition from an inner edge cell profile to an outer edge cell profile having a second, different shape.

FIG. 2 illustrates the geometry of one embodiment of a cell profile shape, which forms a hexagon cell in this instance, and includes geometric terms utilized throughout this disclosure.

FIG. 3 illustrates several examples of cell profiles encompassed herein.

Figure 4:
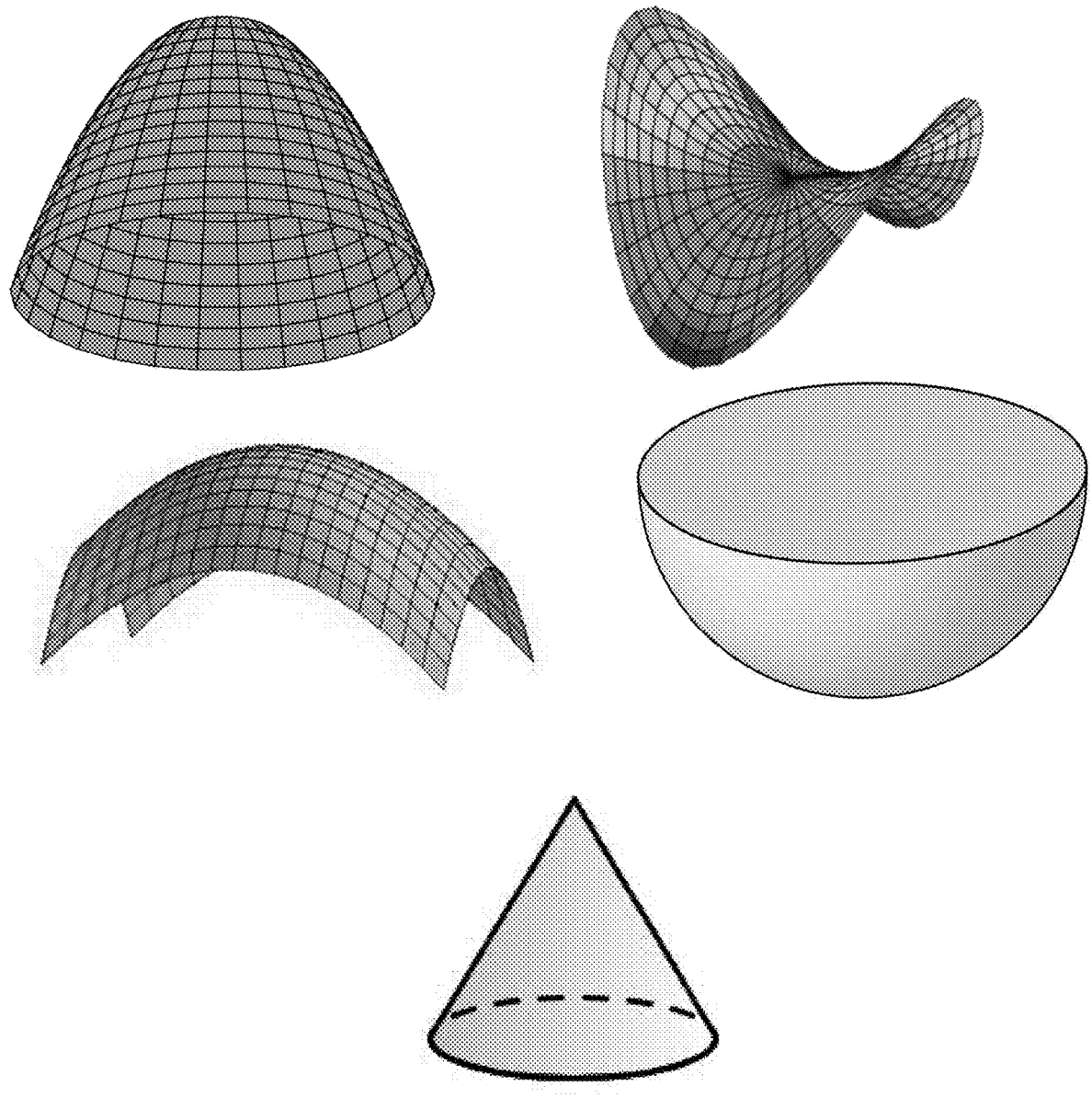
FIG. 4 illustrates several wall shapes as may be formed with a shaped strip as disclosed.

Repeat use of reference characters in the present specification and figures is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment may be used in another embodiment to yield a still further embodiment.

Disclosed herein are structures that include a curved, corrugated wall fabricated from a plurality of layers formed of one or more shaped strips. More specifically, a shaped strip used in fabrication of a structure can include a variable profile across the width of the strip with a first edge of a strip defining a series of cell profiles of a first geometric shape and a second, opposite edge of the strip defining a series of cell profiles of a second, different geometric shape, with each cell transitioning from the first profile to the second profile across the width of the strip. The geometry of the cell profiles at either end of each cell can be designed with respect to one another to allow for radial orientation of the strip about an axis with little or no deformation or stress on the strip edges. This can provide many benefits to structures formed by the strips including the ability to form a structure with a much greater wall thickness than possible for traditional honeycomb-type radially oriented wall structures, as well as the ability to form structures with a large variety of different shapes, including combinations of different curvatures in a single structure, providing possibilities for unique designs for low-density, high-strength structures.

Also disclosed are methods for forming disclosed structures. In general, methods can include formation of a shaped strip to include a series of variable profile cells along the strip length and layering of one or more strips to form a curved wall of a structure. Formation methods can beneficially reduce or eliminate waste of material as compared to many previously known formation methods and formation techniques can include continuous and integral joining of layered strips, which can improve efficiency of formation techniques. Formation methods can also eliminate the time and cost-intensive process of joining multiple thin honeycomb sections to achieve a thick-walled structure. Moreover, disclosed formation techniques can provide improvements in structural performance characteristics by allowing for relatively simple tailoring of one or more design characteristics including, without limitation, formation materials, dimensions of formation materials (e.g., strip width, strip thickness), variation in opposing cell profile shapes and size dimensions, radius of curvature of a structural wall, modification of wall curvature during formation, joining methods, bulk density of formation materials, etc.

Referring to FIG. 1, a single radially aligned strip 10 is illustrated. In this embodiment, strip 10 forms a single joined ring, as may be used to stack with other rings in formation of a structure. However, and as described further herein, a single strip can optionally be coiled upon itself and form a plurality of layers of a structure. In any case, a curve formed by a strip can define an inner radius, $r_i$, and an outer radius, $r_o$.

As shown more clearly in the inset of FIG. 1, a strip 10 is shaped to include a series of cells 12 along the length of the strip 10. Each cell 12 extends from the inner edge 6 of the strip 10 to the outer edge 8 of the strip 10 in the radial direction about the axis 4 of the ring formed by the strip 10. In accord with the present disclosure, the profile of each cell 12 varies in the radial direction from the inner edge 6 of the strip 10 to the outer edge 8 of the strip 10 such that a cell profile 14 on the inner edge 6 of the strip 10 has a different geometric shape than the cell profile 16 of that cell 12 on the outer edge 8 of the strip. For instance, in the embodiment of FIG. 1, the inner cell profile 14 includes a series of half hexagons while the outer cell profile 16 includes a sine wave. As indicated, the cell 12 transitions from the inner profile 14 to the outer profile 16 across the length of the cell 12, which is in the radial direction of the ring formed by the strip 10.

FIG. 2 provides an end view of a single unit cell for a hexagonal cell profile 14 and includes the geometric notations used throughout this disclosure, including:
$l_b$—base length of cell profile
$l_s$—side length of cell profile
θ—cell profile angle
h—total cell height
subscript i—inner edge
subscript o—outer edge
subscript t—transition area between the inner and outer edge As indicated in FIG. 2, each unit cell along the length of a strip includes a single repeating section of the strip. Thus, when stacked with another strip to form completed geometric shapes (e.g., hexagons), a unit cell length can include two instances of the geometric shape of the cell profile, e.g., a hexagon as in FIG. 2. A unit cell profile can thus also be considered and referred to as a single wave profile of a wave pattern formed along the length of the strip.

FIG. 3 illustrates several exemplary cell profiles as may be utilized in embodiments of a structure including, from left to right, square, perfect hexagon, irregular hexagon, and rhombus, showing representative notations for each profile. Of course, edge cell profiles are not limited in any way to specific geometries of the illustrations and other geometries, including regular and irregular polygonal and regular and irregular smooth wave (e.g., sine wave) profiles are encompassed herein.

To provide for the desired radial curvature capability of strip, in which the strip can be layered in the radial direction about an axis as illustrated in FIG. 1, the distance along the inner edge of the strip of the inner cell profile can be substantially equal to the distance along the outer edge of the strip of the outer cell profile. For instance, the inner edge length along a unit cell at the inner profile can be equal to the outer edge length along the unit cell at the outer profile or can vary by about 10% or less. By way of example, the outer edge unit cell profile length can be about 8% longer than the inner edge unit cell profile length or less, about 6% longer or less, about 5% longer or less, about 4% longer or less, about 3% longer or less, or about 2% longer or less. This can be desirable in some embodiments, as a longer outer edge unit cell profile length can allow the maximum radial width of the strip 10 to be increased as compared to when these two lengths are equal while minimizing strain in the strip due to curvature. In general, the outer edge unit cell profile length will not be shorter than the inner edge unit cell profile length, as this can reintroduce structural strain, potentially causing detrimental shape and residual stress issues.

Mathematically, an equivalence between these two-unit cell edge lengths can be stated for polygonal profiles such as those of FIG. 3 as follows:

$$2l_{si}+2l_{bi}=2l_{so}+2l_{bo}$$

In addition to this equivalence (or near equivalence), the projected distance (i.e., horizontally projected distance for a horizontally aligned strip) of the first profile and the second profile will differ, with the projected distance of the inner cell profile being less than the projected distance of the outer cell profile. Mathematically for polygonal profiles such as those of FIG. 3, this relationship can be stated as follows:

$$2l_{bi}+2l_{si}\cos(\theta_i)<2l_{bo}+2l_{so}\cos(\theta_o)$$

In one embodiment, the height h of the inner and outer cells can be held constant along the axis of each individual cell and throughout the stacked layers of cells forming the wall. In such a case, a cylindrical wall can be formed. This is not a requirement, however, and through modification of profile dimensions, such as the height h, of the opposing cell profiles, additional curvature along the axis of the wall can be introduced, in addition to the original radial curvature. For instance, through variation in the height of a profile along a length of a strip and/or through control and modification of the method of feeding a strip in a formation process, a structure can be formed that follows a curved axis, for example forming an elbow in an otherwise cylindrical structure, e.g., a curved pipe.

Modification to cell profiles, including modification to the geometric shape of a profile as well as modification to one or more dimensions of a geometric profile, can be carried out along the axial length of a structure, either through modification of the cells along a continuous spirally wound strip or through modification of the cells of stacked rings along the stack to introduce geometric changes to the overall shape of the structure formed from the strip(s). Variety in structural shapes can be created in one embodiment by adjusting the way a shaped strip interfaces with a formation mechanism, e.g., a gear that is utilized in curving a strip to form a layer, to allow for radial and/or axial variations in the shape of the layer Modifications in cell geometries throughout the structure can provide for variation of overall shape of a structure and formation of structural shapes such as paraboloid, saddle, or hemisphere, examples of which are illustrated in FIG. 4. Moreover, combinations of structural shapes can be utilized to form a single structure. For instance, two hemisphere sections can be formed in conjunction with a cylinder to create a structure having a shape similar to that of a typical pressure vessel. Such a shape could be utilized in one embodiment as a lightweight pressure vessel support or pressure vessel dissipator.

The radial relationship for a ring formed of polygonal profiles such as those illustrated in FIG. 3 with small unit lengths (FIG. 2) can be approximated as follows:

$$\frac{r_o}{r_i} = \frac{l_{bo} + l_{so} \cos \theta_o}{l_{bi} + l_{si} \cos \theta_i}$$

As mentioned previously, the cell profile at the inner edge of a cell differs from that at the outer edge of the cell, with the projected distance of the inner profile being less than the projected distance of the outer profile, and the cell profile transitioning from the inner profile to the outer profile across the length of the cell (equivalent to the width of the strip). For instance, in an embodiment in which the inner cell profile is a square and the outer cell profile is an irregular symmetric hexagon, the cell profile would transition across the cell length from the square relationship of $l_b = 2l_s$ to that of an irregular symmetric hexagonal shape in which $l_b > l_s$ or $l_b < l_s$. Likewise, if the outer cell profile is a perfect hexagon, the transition would be from the square relationship to the perfect hexagon relationship of $l_b = l_s$, and for a rhombus to the relationship in which $l_b = 0$. Additionally, irregular polygons, as well as other geometric shapes, are encompassed herein as well.

The choice of cross-sectional shape at the inner and outer edges can be utilized to determine a preferred radial thickness of the honeycomb. By way of example, when considering the profile geometries of FIG. 3, the largest difference in projected distance of the illustrated shapes is between that of a square and a rhombus. Upon selecting a square for the inner edge profile and a rhombus for the outer edge profile, the width of the strip and the wall thickness of the resulting curved wall can be thicker without introducing strain in the strip due to curvature as compared to two profiles with less difference in horizontally projected distance for a horizontally aligned strip. This is because for a given cell height h, the difference between the circumferential distance swept through a single unit cell at the inner and outer radii will be larger, allowing for a greater distance between the inner and outer edges of the strip (i.e., greater strip width). A transition from a square profile at the inner edge to a rhombus profile at the outer edge can pass through other recognizable profiles. For instance, a profile can transition from the square profile through irregular symmetric hexagonal shapes with $l_b > l_s$ to a perfect hexagon with $l_b = l_s$ to irregular symmetric hexagonal shapes with $l_b < l_s$ to a rhombus, where $l_b = 0$ as indicated by the subscripts of FIG. 3.

Disclosed methods allow for a relatively simple design approach for selecting the inner edge profile and the outer edge profile of a fabrication strip. For example, the inner edge profile can be defined by specifying the inner radius $r_i$, selecting the inner angle $\theta_i$ and the cell height h. The outer angle $\theta_{omax}$ resulting in a maximum strip width defined by maximum outer radius $r_{omax}$ is thus:

$$\theta_{omax} = \sin^{-1}\left(\frac{h \sin \theta_i}{h + 2 l_{bi} \sin \theta_i}\right)$$

$$r_{omax} = \frac{r_i l_{so} \cos \theta_{omax}}{l_{bi} + l_{si} \cos \theta_i}$$

In one embodiment, utilizing the cell profiles of FIG. 3, an inner cell profile can vary from a square to a perfect hexagon according to the equation:

$$l_{bi} = \frac{2}{\pi}(3 - \sqrt{3})h\theta_i - (2 - \sqrt{3})h$$

in which $\frac{\pi}{3} \le \theta_i \le \frac{\pi}{2}$

At $\theta_i = \pi/3$ the inner cell profile can form a perfect hexagon cell structure, and at $\theta_i = \pi/2$ the inner cell profile can form a square cell structure. Values within the range will provide cell structures of irregular hexagons. The side length is described by:

$$l_{si} = \frac{h}{2 \sin \theta_i}$$

Using these relationships, the outer edge profile can be determined and set for a given strip width, up to the maximum strip width for no curvature strains, which would be at a cell profile of a rhombus when considering the exemplary cell profiles of FIG. 3. This is because for a given perimeter sweep length the square cell profile covers the least distance, while the rhombic cell profile covers the greatest distance of the exemplary cell profiles. Mathematical analyses demonstrate that for these exemplary cell shapes, the maximum strip width (i.e., wall thickness) at which there will be no strain in the strip due to the curvature will be 41.42% of the inner radius $r_i$, independent of cell height, h. As such the strip width, in some embodiments, can be about 45% or less of the inner radius $r_i$ of the structure, such as about 44% or less, about 43% or less, about 42% or less, or about 41% or less. Beneficially, the strip width (and hence, the wall thickness of a formed structure) can be greater than possible with traditionally formed radially oriented shaped strips, due to the lack of strain in the strip due to curvature. For instance, the strip width can be about 10% or greater of the inner radius $r_i$ of the structure, such as about 15% or greater, about 20% or greater, about 25% or greater, about 30% or greater, or about 35% or greater.

There are no particular requirements regarding the height h of cells of a structure formed with shaped strips as disclosed herein. In general, the height of a single layer strip is relatively small compared to the total height of a structure wall that includes a plurality of layered strips, but this is not a requirement of a structure as may be formed with the disclosed shaped strips. However, as the height of a cell h is a component of the side length, $l_s$, of a profile, this parameter will come into effect in designing the inner and outer edge profiles of a strip.

There are also particular requirements regarding the thickness of a strip, though in general, the thickness of a strip will be small compared to the cell height of a chosen pattern. For instance, in one embodiment, cell height can be from about 0.25 inches to about 2 inches, and a typical metal foil strip shaped to form a curved wall can generally have a thickness of about 0.003". Larger and smaller cell sizes and fabrication strips are encompassed herein.

Among other benefits of disclosed structures, a structure formed by stacking radially oriented strips as described herein can exhibit a varying crush strength profile across the structure due to the different cell profiles across each strip and the bulk density of the stacked strips. For instance, the crush strength of a curved wall formed by stacked strips can be tailored as desired, for instance, exhibit increasing crush strength along the radial direction in formation of a progressively strong impact absorber.

Fabrication methods can include shaping a generally planar strip of material to form the different edge profiles and the transition therebetween. Materials that can be used in the fabrication can thus include any ductile material capable of withstanding localized plastic strains induced in the shaping to form the shaped strips, including materials that are shaped and then set in the final form, for instance, by curing through cooling, heating, adhesive addition, or curing, etc. Exemplary materials can include, without limitation, paper (e.g., cardboard), ductile metals, (e.g., titanium, tin, aluminum, and steel alloys), and ductile polymers (e.g., softened thermoplastics, preset thermosets).

Figure 5:
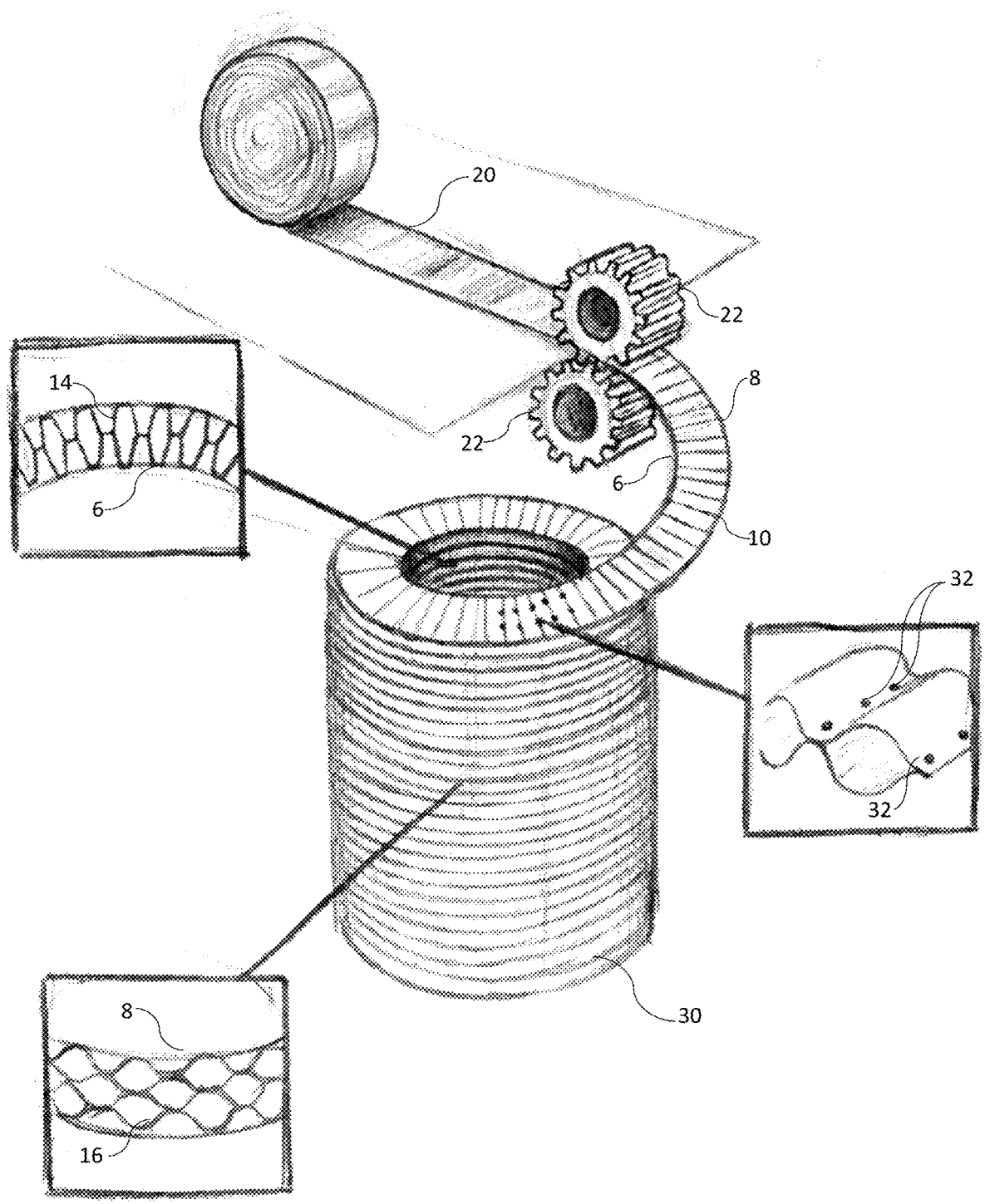
FIG. 5 illustrates one embodiment of a formation method in which a strip is shaped and then spirally wound to form a cylindrical wall.

FIG. 5 presents one embodiment of formation techniques. As illustrated, a generally planar strip 20 of a ductile material can be fed through a pair of tooling dies 22. The tooling dies can be fabricated to provide the desired unit cell shape across the width of the strip, including the first profile 14 at a first edge 6, which will be the inner edge 6 upon curvature of the strip, and the second, different profile 16 at a second edge 8, which will be the outer edge 8 upon curvature of the strip. As indicated in FIG. 5, in this particular embodiment, the first profile 14 is an irregular hexagon profile and the second profile 16 is a sine wave profile.

Upon forming between the tooling dies 22, the formed strip 10 is expelled from the dies 22 and due to the difference in profile across the strip, will naturally curve and can be spiraled around an axis such that multiple layers of the strip 10 are provide forming a continuous strip cylindrical structure 30. In other embodiments, a formed strip 10 can form a single ring, as illustrated in FIG. 1, and multiple individual rings can be stacked to form a structure.

As the layers are applied to one another, either by spiraling a single strip, stacking multiple rings, or combination thereof, the layers can be attached to one another at attachments 32. Attachments 32 can be spot attachments, e.g., spot welds or brazing, using an attachment mechanism such as a rivet or an adhesive, or can be linear attachments, e.g., lengths of adhesive, brazing, or welding along a segment of contact between adjacent layers of a structure.

As indicated in FIG. 1 and FIG. 5, a structure can include multiple layers of a shaped strip, with adjacent layers to one another in the axial direction of the wall forming cells of the desired geometry, e.g., an irregular hexagon as at the inner edge 6 of the cylinder of FIG. 5. As such, the unit cell length will be such that upon layering, cell halves are proper aligned for attachment, forming complete cell geometries in the axial direction of the wall.

In general, an integer or half integer number of a unit cell can form a single layer of the structure, so as to ensure that adjacent layers will align properly. The preferred number of unit cells in a single layer of a structure can vary widely, however, and can generally depend upon the size of the structure and the dimensions of the unit cell as well as on whether the adjacent layers are of a single spiraled strip or separate stacked rings.

Figure 6:
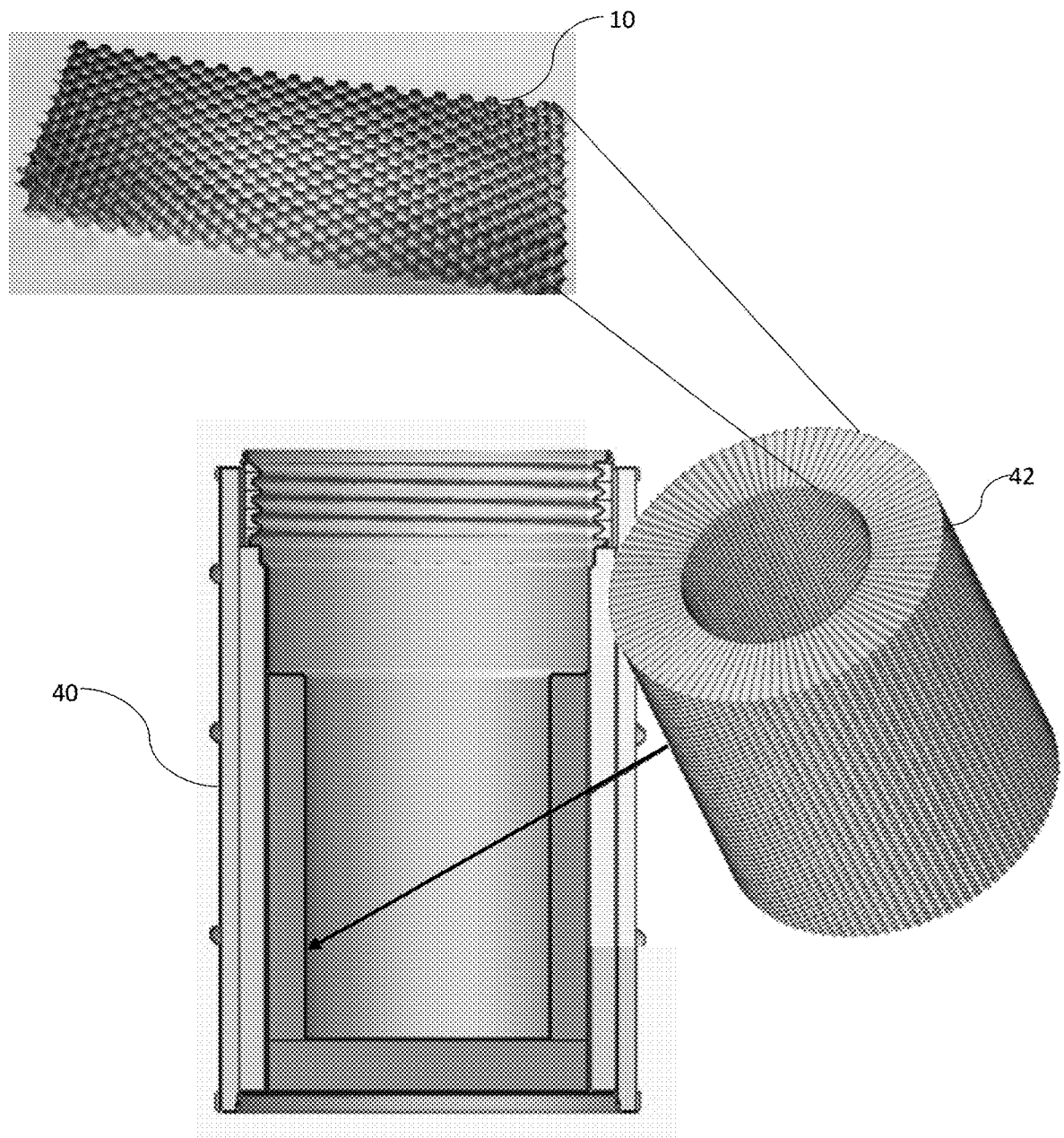
FIG. 6 illustrates a container as may include a cylindrical support structure formed with a shaped strip as disclosed.

Corrugated walls as described herein can be useful in a variety of different applications including, without limitation, in providing low density parts and materials for use in aerospace applications, e.g., nacelles and turbine engines; in providing lightweight, energy absorbing structures (e.g., whip restraint) in piping applications (e.g., oil, gas, nuclear piping); providing lightweight flame arrestors, wind covers, venting materials, utility towers, etc.; providing strong and lightweight containers for storage, e.g., storage of hazardous material such as drum storage of radioactive material; etc. By way of example, FIG. 6 illustrates one embodiment of a container 40 that can include a cylindrical structure 42 within the interior of the structure, for instance, to provide strength, sound insulation, thermal insulation, etc. The structure 42 includes multiple radially aligned layers of a shaped strip 10, as described herein.

While certain embodiments of the disclosed subject matter have been described using specific terms, such description is for illustrative purposes only, and it is to be understood that changes and variations may be made without departing from the spirit or scope of the subject matter.

What is claimed is:

1. A structure comprising a wall,
the wall defining a radius of curvature and comprising a radially oriented strip that includes a first edge at an inner surface of the wall and a second edge at an outer surface of the wall,
the strip defining an array of cells, each cell having a cell length extending from the first edge to the second edge in the radial direction of the wall curvature, and
each cell defining a first unit cell profile comprising a first geometric shape at the first edge and a second, different unit cell profile comprising a second, different geometric shape at the second edge, the first unit cell profile transitioning to the second unit cell profile across the cell length;
wherein the length of the second edge along the second unit cell profile is substantially equal to the length of the first edge along the first unit cell profile,
wherein at least one of the first and second geometric shapes comprises a sine wave, wherein the radially oriented strip exhibits a radial curvature due to the change in the different unit cell profiles across a width of the radially oriented strip, and
wherein the radially oriented strip spirals about an axis of the radius of curvature of the wall such that the strip forms a plurality of layers of the wall.

2. The structure of claim 1, wherein the first unit cell profile comprises a component of a first polygon and the second unit cell profile comprises a sine wave.

3. The structure of claim 2, wherein the first unit cell profile comprises a component of a square or a hexagon, and the second unit cell profile comprises a sine wave.

4. The structure of claim 1, wherein the length of the cell from the first edge to the second edge is about 45% or less of a radius extending from an axis of the wall radius of curvature to the first edge of the strip.

5. The structure of claim 1, wherein the length of the cell from the first edge to the second edge is about 10% or greater of a radius extending from an axis of the wall radius of curvature to the first edge of the strip.

6. The structure of claim 1, the radially oriented strip comprising paper, a metal, or a polymer.

7. A method for forming a structure comprising:
shaping a strip such that upon the shaping, the strip defines a series of cells along a length of the strip, each cell having a cell length extending from the first edge to the second edge in the radial direction of a wall curvature, and each cell defining a first unit cell profile comprising a first geometric shape at the first edge and a second, different unit cell profile comprising a second, different geometric shape at the second edge, the first unit cell profile transitioning to the second unit cell profile across the cell length, wherein the length of the second edge along the second unit cell profile is substantially equal to the length of the first edge along the first unit cell profile, wherein at least one of the first and second geometric shapes comprises a sine wave,
wherein upon the shaping, the shaped strip exhibits a radial curvature due to the change in the different unit cell profiles across a width of the shaped strip; and
layering the shaped strip such that the shaped strip is spiraled around an axis and forms a plurality of layers of a curved wall of the structure.

8. The method of claim 7, further comprising modifying an aspect of the shaping and thereby introducing one or more additional radii of curvature to the structure.

9. The method of claim 8, the modifying comprising altering a cell height of successive cells along the length.

10. The method of claim 8, the modifying comprising altering the shape of the first unit cell profile or the second unit cell profile of successive cells along the length.

11. The method of claim 8, the modifying comprising altering an aspect of the step of layering the shaped strip about the axis.

12. The method of claim 7, further comprising attaching the at least one layer of the curved wall to an adjacent layer of the curved wall.

13. The method of claim 12, wherein the attaching comprises welding, brazing, or adhesive curing.

14. The structure of claim 1, wherein there is no strain in the radially oriented strip due to the radial curvature of the strip.

* * * * *